US012731479B2

(12) United States Patent

Lingala et al.

(10) Patent No.: US 12,731,479 B2

(45) Date of Patent: Sep. 8, 2026

(54) HAZARD DETECTION EVALUATION SYSTEM

(71) Applicant: Kidde Fire Protection, LLC, Bradenton, FL (US)

(72) Inventors: Ramesh Lingala, Hyderabad (IN); Saikrishna Gajula, Hyderabad (IN); Ramakrishna Pulluru, Hyderabad (IN); Pirammanayagam Nallaperumal, Hyderabad (IN); Rizwana Begum, Hyderabad (IN); Adam Kuenzi, Salem, OR (US)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 248 days.

(21) Appl. No.: 18/541,749

(22) Filed: Dec. 15, 2023

(65) Prior Publication Data

US 2024/0212480 A1 Jun. 27, 2024

Related U.S. Application Data

(60) Provisional application No. 63/477,128, filed on Dec. 23, 2022.

(51) Int. Cl.
*G08B 29/02* (2006.01)

(52) U.S. Cl.
CPC .................................... *G08B 29/02* (2013.01)

(58) Field of Classification Search
CPC ...................................................... G08B 29/02
USPC .......................................................... 340/514
See application file for complete search history.

(56) References Cited

U.S. PATENT DOCUMENTS

| | | | |
|---|---|---|---|
| 7,019,646 B1 | 3/2006 | Woodard et al. | |
| 7,242,288 B2 | 7/2007 | Kaiser et al. | |
| 7,623,028 B2 | 11/2009 | Kates | |
| 9,049,567 B2 | 6/2015 | Le Guen et al. | |
| 9,520,042 B2 | 12/2016 | Eck | |
| 9,600,989 B2 | 3/2017 | Fadell et al. | |
| 10,049,562 B2 | 8/2018 | Volam et al. | |
| 10,078,959 B2 | 9/2018 | Rossi et al. | |
| 10,636,269 B2 | 4/2020 | Lacy | |
| 11,237,714 B2 | 2/2022 | Sundermeyer et al. | |
| 11,328,582 B1 | 5/2022 | Younge | |
| 12,489,673 B2 * | 12/2025 | Nallaperumal | H04L 41/0806 |
| 2005/0253709 A1 | 11/2005 | Baker | |
| 2009/0303032 A1 * | 12/2009 | Bork | G01V 8/20 345/440.2 |

(Continued)

FOREIGN PATENT DOCUMENTS

WO 2019165422 A1 8/2019

*Primary Examiner* — Travis R Hunnings

(74) *Attorney, Agent, or Firm* — CANTOR COLBURN LLP

(57) ABSTRACT

A method and system for determining safety device coverage for a property. The method includes providing identifying information associated with a property to a mobile device; initiating safety device electronic beacon recognition on the mobile device; touring the property with the mobile device having safety device electronic beacon recognition initiated and obtaining safety device information; storing safety device information obtained during touring; and analyzing the safety device information to determine safety device coverage associated with the property.

17 Claims, 1 Drawing Sheet

(56) References Cited

U.S. PATENT DOCUMENTS

| | | | | |
|---|---|---|---|---|
| 2011/0121968 | A1* | 5/2011 | Hart | G08B 29/145<br>340/540 |
| 2014/0180725 | A1* | 6/2014 | Ton-That | G06Q 10/10<br>705/4 |
| 2015/0077248 | A1 | 3/2015 | Eck | |
| 2016/0007179 | A1 | 1/2016 | Kim | |
| 2018/0096589 | A1* | 4/2018 | Lynch | G08B 29/12 |
| 2018/0356241 | A1* | 12/2018 | Correnti | H04L 67/12 |
| 2020/0128396 | A1* | 4/2020 | Mars | H04W 12/50 |
| 2021/0350692 | A1* | 11/2021 | Nalukurthy | G08B 5/36 |
| 2023/0179978 | A1* | 6/2023 | Mucho | H04W 4/80<br>455/41.1 |
| 2023/0215268 | A1* | 7/2023 | Nalukurthy | G08B 29/043<br>340/514 |
| 2023/0222801 | A1* | 7/2023 | Rao | G08B 29/00<br>340/506 |
| 2024/0289596 | A1* | 8/2024 | Williams | G06N 3/0475 |

* cited by examiner

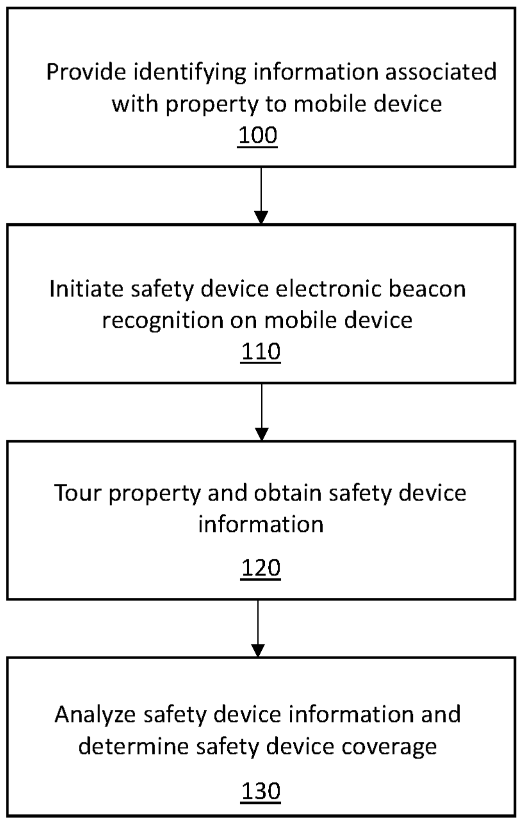
Provide identifying information associated with property to mobile device
100
Initiate safety device electronic beacon recognition on mobile device
110
Tour property and obtain safety device information
120
Analyze safety device information and determine safety device coverage
130

HAZARD DETECTION EVALUATION SYSTEM

CROSS REFERENCE TO RELATED APPLICATIONS

This application claims the benefit of U.S. Provisional Patent Application No. 63/477,128 filed on Dec. 23, 2022, which is incorporated by reference herein in its entirety.

BACKGROUND

The embodiments herein generally relate to safety systems.

There are many commercially available systems for detecting hazardous conditions such as smoke or carbon monoxide, for example. Such systems are designed to include a compact main body that can be easily and unobtrusively secured to a wall or ceiling, and to activate a notification system upon detection of the harmful substances.

These systems may operate independently and several such devices are typically found throughout a structure. Integrated systems are also known that utilize a plurality of networked detection devices that communicate with a centralized controller which can alert an alarm monitoring company. In both instances, the coverage provided by the detection devices must be evaluated manually and that information is not readily available

BRIEF DESCRIPTION

Disclosed herein is a method to determine safety device coverage for a property comprising: providing identifying information associated with a property to a mobile device; initiating safety device electronic beacon recognition on the mobile device; touring the property with the mobile device having safety device electronic beacon recognition initiated and obtaining safety device information; storing safety device information obtained during touring; and analyzing the safety device information to determine safety device coverage associated with the property.

In one or more embodiments, identifying information associated with the property comprises one or more of geographic location of the property; images, videos, anchor points, and external links associated with the property; augmented reality content, tax identification number and real estate listing identification number.

In one or more embodiments, the safety device information comprises one or more of location within the property, hazard type detected, and safety device status.

In one or more embodiments, the method further comprises ending safety device electronic beacon recognition with the mobile device when one or more of the following occurs a user end ends safety device electronic beacon recognition, a predetermined amount of time has passed since initiating electronic safety beacon recognition, the mobile device is no longer located within a geofence surrounding the property, the rate of discovery of safety devices is low and a predetermined amount of time has passed.

In one or more embodiments, providing identifying information associated with a property comprises wireless communicating the information from a database.

In one or more embodiments, identifying information is communicated using an access control device. The access control device may be a lock box or smart lock.

In one or more embodiments, storing the safety device information obtained during touring occurs on the mobile device and the method further comprises communicating the stored safety device information to a server, analyzing the safety device information using an analysis module on the server, and storing the analysis on the server.

In one or more embodiments, the safety device coverage associated with the property is in the form of an augmented reality map.

In one or more embodiments, the method further comprises scanning a code on a safety device for safety device information.

Also disclosed herein is a property safety evaluation system comprising: an access control device having a communication module for providing identifying information associated with a property to a mobile device; and a server having an analysis module for analyzing safety device information associated with the property obtained by the mobile device.

In one or more embodiments, the access control device is configured to receive safety device information from the mobile device and communicate it to the server.

In one or more embodiments, the mobile device is configured to communicate safety device information associated with the property to the server.

In one or more embodiments, the access control device is a lock box.

In one or more embodiments, the access control device is a smart lock.

In one or more embodiments, the access control device is configured to validate the credentials associated with the mobile device prior to providing identifying information associated with the property The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 1 shows a flow chart for the method disclosed herein.

DETAILED DESCRIPTION

A detailed description of one or more embodiments of the disclosed apparatus and method are presented herein by way of exemplification and not limitation with reference to the Figures.

While the specification concludes with claims defining the features of the invention that are regarded as novel, it is believed that the invention will be better understood from a consideration of the description in conjunction with the drawings. As required, detailed embodiments are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art. Further, the terms and phrases used herein are not intended to be limiting but rather to provide an understandable description of the invention.

As described herein, the term "hazardous condition" which a safety device can detect includes the presence of smoke, fire, heat, radon, radiation, carbon monoxide, natural gas, propane or a combination of the foregoing.

One of the challenges that real estate marketing and insurance companies face is the lack of information on the number rooms in a home with safety devices installed. Capturing the number of rooms/spaces inside a home in combination with the number and location of safety devices will help estimate the coverage of safety devices. This information is useful for insurance companies and safety experts to advise a homeowner about the safety device coverage present in the home. Additionally, it is a useful feature for potential home buyer. For example, a real estate agent would be able to provide an estimated amount of coverage based on the number, location and type of safety devices present in the home.

Disclosed herein is a method and system for determining safety device coverage for a property. The method includes providing identifying information associated with a property to a mobile device; initiating safety device electronic beacon recognition on the mobile device; touring the property with the mobile device having safety device electronic beacon recognition initiated and obtaining safety device information; storing safety device information obtained during touring; and analyzing the safety device information to determine safety device coverage associated with the property.

The property safety evaluation system may include an access control device having a communication module for providing identifying information associated with a property to a mobile device; and a server having an analysis module for analyzing safety device information associated with the property obtained by the mobile device.

"Identifying information" may include information comprising one or more of geographic location of the property; images, videos, anchor points, real estate listing number, tax identification number, and external links associated with the property; and augmented reality content. Identifying information may be assigned by and stored in a server, accessible to users and/or mobile devices that have authenticated server credentials (e.g., an authorized user or mobile device). Identifying information may also include location data based on a global positioning system (GPS) coordinate, street/city/state addressing information, current owner information, illustrations, pictures (still images or videos) of the property, external links, such as a property appraiser's website or a real estate multiple listing service, etc. The geographic area may be defined by way of example, as a neighborhood, a pre-defined radius from the property location or may be determined by geofencing techniques. For example, identifying information may include places of interest, such as nearby schools, places of worship, shops, etc. Identifying information may also include augmented reality (AR) content. AR content may be identifying information observable as an overlay to the real-world image of the property, such as text, graphics, pictures, still images, videos, illustration and external links, and viewable on a mobile device.

When providing identifying information incorporates communication from an asset control device the identifying information can include asset control device ownership; a unique identifier associated with at least one of the asset control device, the mobile device, and the property; For example, identifying information may include information associated with the asset control device, including a description of the asset control device (e.g., date/time/place deployed, by whom, asset control device owner, etc.), or associated with the property corresponding to the asset control device. Exemplary asset control devices include lock boxes and smart locks. In some embodiments, identifying information which may include the location of other nearby lock boxes within a geographic area.

In some embodiments, the identifying information and/or the safety device information may be viewed on a mobile device when the mobile device and the asset control device are at a distance to communicate by way of short-range communication protocols as further described below. In some embodiments, the wireless communication between the mobile device and the asset control device may be triggered by scanning a lock box QR code and/or bar code with the mobile device.

The mobile device may be a two-way communication device such as a mobile phone or "smart" phone or other type of telephone, a personal digital assistant (PDA), a personal computer or tablet device, or an augmented reality device, which may be a feature of any of the foregoing, or may be a separate device, such as an augmented reality headset (e.g., Google Glass, Microsoft HoloLens, etc.). The mobile device may include a processor, memory, a communication module, and an application. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in the mobile device including executable instructions stored therein, for instance, as firmware. The communication module may implement one or more communication protocols, such as, for example, shortrange wireless protocols and long-range wireless protocols. Short-range wireless protocols may include but are not limited to Bluetooth, Wi-Fi, HaLow (801.11ah), zWave, ZigBee, or Wireless M-Bus. Long-range wireless protocols may include but are not limited to cellular, satellite, LTE (NB-IoT, CAT M1), LoRa, Satellite, Ingenu, or SigFox. In some embodiments, a lock box may use or support the use of Bluetooth wireless communications, either instead of or in addition to IrDA communications capability.

The property safety evaluation method and system may be provided with a custom mobile application (i.e., app) for execution on a mobile device such as a smartphone or tablet, for example. The app can include functionality for allowing a user to send and receive information with the mobile device. The app further includes functionality allowing the mobile device to recognize a safety device electronic beacon. The information communicated can include identifying property information as well as safety device information including one or more of the following: location of the safety device within the property, the type of safety device detected (e.g., what type of hazard the safety device can detect), the model of the safety device, the range of the safety device, the manufacture date of the safety device, and the operational status of the safety device.

Touring the property with the mobile device having safety device electronic beacon recognition initiated allows the mobile device to recognize and register safety devices present on the property. It is further contemplated that safety devices may be recognized and registered by scanning an electronic code such as a QR code or bar code on the safety device with a camera on the mobile device. Scanning a code may be used in place of electronic beacon recognition or in addition to electronic beacon recognition. In cases where electronic beacon recognition and scanning are used together the analysis of the information will account for any duplication of devices. The mobile device collects safety device information as described above during the tour. The safety device information can be communicated to a server during the tour, or it can be stored on the mobile device and communicated to a server once the tour is complete. In some embodiments, the safety device information is stored temporarily on the mobile device and then communicated to the asset control device and the asset control device sends the information to the server.

Safety device electronic beacon recognition with the mobile device may be ended when one or more of the following occurs: a user end ends safety device electronic beacon recognition, a predetermined amount of time has passed since initiating electronic safety beacon recognition, the mobile device is no longer located within a geofence surrounding the property, the rate of discovery of safety devices is low and a predetermined amount of time has passed.

The safety device information is analyzed and the safety device coverage for the property is calculated. The safety device coverage may be determined by dividing the square footage of the property by the number of safety devices present. Square footage of the property is generally defined as square footage of living space. The safety device coverage determination may be modified to account for local governmental requirements associated with safety device coverage. For example, a crawl space may not be defined as livable space but governmental requirements may require a safety device in or near the crawl space if a furnace is located therein. The safety device coverage would then be determined based on square footage of living space/the number of devices in the living space and an indication of the presence or absence of a safety device in an acceptable location associated with the crawl space. This is one non-limiting example of the adaption of the safety device coverage calculation adaptation to local requirements. The square footage of the property may be provided by a user, automatically determined from the identifying information in combination with access to an online database such as tax records, home sale records or the like or estimated during the survey of the property. The calculated safety device coverage can be provided in any applicable format including but not limited to an augmented reality map of the property.

Exemplary safety devices may include a main body that houses a notification unit, a detection unit, a processing unit, and a communication unit. One or more of the notification unit, detection unit, processing unit and communication unit may be combined to form a combination unit such as a processing and combination unit. There is no particular limitation on the shape, size, or construction material for the main body. The back surface of the main body can include any number of different brackets or receivers for engaging mounting hardware such as screws, for example. The notification unit can include any number of different devices capable of providing an audible and/or visual indication to a user. The detection unit may be positioned within the main body and can include one or more sensors capable of detecting a hazardous condition. For example, the detection unit can include one or more sensors such as a smoke detection sensor, a heat detection sensor, a carbon monoxide sensor, a radon detection sensor, a natural gas detection sensor, a propane detection sensor, a radiation detection sensor, or a combination thereof. The processing unit may include a processor that is conventionally connected to an internal memory, a wireless interface, a location detection unit, a user interface, a component interface unit and/or a power source. Although illustrated as separate elements, those of skill in the art will recognize that one or more system components may comprise or include one or more printed circuit boards (PCB) containing any number of integrated circuit or circuits for completing the activities described herein. The processing unit may include one or more integrated circuits having firmware for causing the circuitry to complete the activities described herein. The processing unit can be a conventional central processing unit (CPU) or any other type of device, or multiple devices, capable of manipulating or processing information such as program code stored in the memory in order to allow the device to perform the functionality described herein. The memory can act to store operating instructions in the form of program code for the processor to execute. Memory can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example, containing programs that permit the processor to perform the functionality described below. Additionally, memory can also include one or more cache memories that provide temporary storage of at least some program code in order to reduce the number of times program code must be retrieved from the bulk storage device during execution. Each of these devices are well known in the art. The communications unit can include any number of components capable of sending and/or receiving electronic signals with an externally located device, either directly or over a network. The communication unit can include a cellular transceiver having an antenna for sending and receiving signals over a cellular network. Of course, any number of other known transmission and reception mechanisms and protocols can also be utilized herein, several nonlimiting examples include Bluetooth transceivers, Near-Field-Communication (NFC) devices, unique radio frequencies, and/or a network adapter for communicating over a WAN, LAN or the internet via an internet service provider, for example. The communication unit emits an electronic beacon which is recognized by the mobile device. The electronic beacon may provide information including one or more of the following: the type of hazard detected (e.g., what type of hazard the safety device can detect), the model of the safety device, the range of the safety device, the manufacture date of the safety device, and the operational status of the safety device.

Turning now to the figure, FIG. 1 is a flow chart of the method to determine existing safety device coverage for a property. At step 100 identifying information associated with the property is provided to a mobile device. At step 110, safety device electronic beacon recognition is initiated on the mobile device. At step 120, safety device information for the property is gathered while touring the property. At step 130, safety device information is analyzed to determine safety device coverage.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method to determine safety device coverage for a property comprising providing identifying information associated with a property to a mobile device;

initiating safety device electronic beacon recognition on the mobile device;

touring the property with the mobile device having safety device electronic beacon recognition initiated and obtaining safety device information;

storing safety device information obtained during touring; and analyzing the safety device information to determine safety device coverage associated with the property;

wherein determining the safety device coverage includes providing an estimated amount of safety device coverage based on the number, location and type of safety devices present in the property;

wherein determining the safety device coverage includes dividing a square footage of the property by the number of safety devices present in the property, the safety device coverage modified to account for local governmental requirements associated with safety device coverage.

2. The method of claim 1, wherein the identifying information associated with the property comprises one or more of geographic location of the property; images, videos, anchor points, and external links associated with the property; augmented reality content, tax identification number and real estate listing identification number.

3. The method of claim 1, wherein the safety device information comprises one or more of location within the property, hazard type detected, and safety device status.

4. The method of claim 1 further comprising ending safety device electronic beacon recognition with the mobile device when one or more of the following occurs a user end ends safety device electronic beacon recognition, a predetermined amount of time has passed since initiating electronic safety beacon recognition, the mobile device is no longer located within a geofence surrounding the property, the rate of discovery of safety devices is low and a predetermined amount of time has passed.

5. The method of claim 1, wherein providing identifying information associated with a property comprises wireless communicating the information from a database.

6. The method of claim 5, wherein the identifying information is communicated using an access control device.

7. The method of claim 6, wherein the access control device is a lock box.

8. The method of claim 6, wherein the access control device is a smart lock.

9. The method of claim 1, wherein storing the safety device information obtained during touring occurs on the mobile device and further comprising communicating the stored safety device information to a server, analyzing the safety device information using an analysis module on the server, and storing the analysis on the server.

10. The method of claim 1, wherein the safety device coverage associated with the property is in the form of an augmented reality map.

11. The method of claim 1, further comprising scanning a code on a safety device for safety device information.

12. A property safety evaluation system comprising an access control device having a communication module for providing identifying information associated with a property to a mobile device; and a server having an analysis module for analyzing safety device information associated with the property obtained by the mobile device;

wherein in operation, the system performs operations including:

providing the identifying information associated with a property to a mobile device;

initiating safety device electronic beacon recognition on the mobile device;

touring the property with the mobile device having safety device electronic beacon recognition initiated and obtaining safety device information;

storing safety device information obtained during touring; and analyzing the safety device information to determine safety device coverage associated with the property;

wherein determining the safety device coverage includes providing an estimated amount of safety device coverage based on the number, location and type of safety devices present in the property;

wherein determining the safety device coverage includes dividing a square footage of the property by the number of safety devices present in the property, the safety device coverage modified to account for local governmental requirements associated with safety device coverage.

13. The property safety evaluation system of claim 12, wherein the access control device is configured to receive safety device information from the mobile device and communicate it to the server.

14. The property safety evaluation system of claim 12, wherein the mobile device is configured to communicate safety device information associated with the property to the server.

15. The property safety evaluation system of claim 12, wherein the access control device is a lock box.

16. The property safety evaluation system of claim 12, wherein the access control device is a smart lock.

17. The property safety evaluation system of claim 12, wherein the access control device is configured to validate the credentials associated with the mobile device prior to providing identifying information associated with the property.

* * * * *